(12) United States Patent
Liu

(10) Patent No.: US 8,643,537 B2
(45) Date of Patent: Feb. 4, 2014

(54) METHOD FOR PROCESSING AN ECHO AMPLITUDE PROFILE GENERATED BY A PULSE-ECHO RANGING SYSTEM

(75) Inventor: Jing Liu, Peterborough (CA)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 13/276,005

(22) Filed: Oct. 18, 2011

(65) Prior Publication Data

US 2012/0092210 A1   Apr. 19, 2012

(30) Foreign Application Priority Data

Oct. 18, 2010   (EP) .................................... 10187933

(51) Int. Cl.
G01S 13/08   (2006.01)

(52) U.S. Cl.
USPC ......................................... 342/124; 342/195

(58) Field of Classification Search
USPC ......................................... 342/118, 124, 195
See application file for complete search history.

(56) References Cited

U.S. PATENT DOCUMENTS

| 5,705,750 | A   |   | 1/1998 | Mizukami et al. |
| 6,054,946 | A   | * | 4/2000 | Lalla et al. ..................... 342/124 |
| 6,597,309 | B1  | * | 7/2003 | Panton et al. .................. 342/134 |
| 6,864,833 | B2  | * | 3/2005 | Lyon ............................... 342/124 |
| 7,551,122 | B1  | * | 6/2009 | Delin et al. .................... 342/124 |
| 2007/0186678 | A1 |   | 8/2007 | Griessbaum et al. |
| 2007/0201309 | A1 |   | 8/2007 | Brown et al. |
| 2008/0034863 | A1 | * | 2/2008 | Bartoli et al. ................. 73/290 R |
| 2009/0121917 | A1 | * | 5/2009 | Delin et al. .................... 342/124 |
| 2009/0257311 | A1 |   | 10/2009 | Daigle |
| 2010/0070208 | A1 | * | 3/2010 | Sai ................................... 702/55 |
| 2010/0156702 | A1 | * | 6/2010 | Edvardsson ................... 342/124 |
| 2010/0207807 | A1 | * | 8/2010 | Kuhlow et al. ................. 342/124 |
| 2010/0223019 | A1 | * | 9/2010 | Griessbaum et al. ........... 702/75 |
| 2012/0092210 | A1 | * | 4/2012 | Liu .................................. 342/124 |
| 2012/0174664 | A1 | * | 7/2012 | Welle et al. ................. 73/290 V |

FOREIGN PATENT DOCUMENTS

| DE | 10 2005 063 079 | 7/2007 |
| EP | 0 732 598 | 9/1996 |
| EP | 1 821 117 | 8/2007 |
| EP | 2 110 648 | 10/2009 |

OTHER PUBLICATIONS

Barshan, Billur, "A Bat-Like Sonar System for Obstacle Localization" IEEE Transactions on Systems, Man and Cybernetics, IEEE Inc. New York, US, vol. 22, No. 4, Jul. 1, 1992, pp. 636-646, XP000298602, ISSN: 0018-9472, DOI: 10.1109/21.156577; p. 639, figure 4; pp. 640-641, chapter C, Parabolic Fit to the Signal Envelope.

* cited by examiner

*Primary Examiner* — John B Sotomayor
(74) *Attorney, Agent, or Firm* — Cozen O'Connor

(57) ABSTRACT

A method for considering an echo amplitude profile as a result of convoluting a single echo with a channel response sequence, wherein for multiple echo detection, an estimation task is broken into three major steps comprising estimating a channel response, recovering a full shape of a single echo, and iteratively updating the channel response and echo shape to increase their accuracy. The estimation of the channel response is treated as a single echo detection problem and includes estimating the strongest echo for its position and amplitude, removing an echo corresponding to this recovered channel from the echo amplitude profile, and repeating the preceding steps for the next strongest echo.

7 Claims, 6 Drawing Sheets

METHOD FOR PROCESSING AN ECHO AMPLITUDE PROFILE GENERATED BY A PULSE-ECHO RANGING SYSTEM

BACKGROUND OF THE INVENTION

1. Field of the Invention

The present invention relates to pulse-echo ranging and, more particularly, to a method for processing an echo amplitude profile generated by a pulse-echo ranging system

2. Description of the Related Art

Pulse-echo ranging systems, or time-of-flight ranging systems, are commonly used in level measurement applications to determine the distance to a reflective surface of a material, such as liquid, slurry or solid, by measuring how long after transmission of an energy pulse the echo or reflected pulse is received. Typically, pulse-echo ranging systems use ultrasonic, radar or microwave pulses and generally include a transmitter for transmitting the energy pulses, a receiver for receiving the echoes and a signal processor for detecting and calculating the distance or range of the material surface, based on the travel times of the transmitted energy pulses and the echoes. The transmitter and receiver may be combined in a single unit. The signal processor forms an echo amplitude profile representing the received echo amplitudes as a function of their respective travel times. Each value of the echo amplitude profile corresponds to the amplitude of an echo reflected at a certain distance from the transmitter/receiver.

One main problem of echo processing is selecting the wanted level echo from other multiple echoes that may occur at short ranges, when measuring shallow liquid levels or by reflections from obstacles in the measuring environment such as the internal structure of and installations in a tank or vessel containing the material. The echoes may overlap and may be further distorted by energy lost, delay or noise corruption.

It is thus a challenge to identify the echo of interest that corresponds to the material. It is also important to assess a level of confidence that the echo selected is indeed the echo of interest.

A commonly used technique for finding valid echoes in an echo amplitude profile involves generating a time-varying threshold (TVT) function. The TVT function provides a baseline on the echo profile indicating the level of noise and the presence of obstacles. Various algorithms and techniques are known for determining a noise floor and generating the TVT function. Valid echoes appear above the TVT function. Based on a variety of criteria (e.g., time of arrival, amplitude, amplitude and/or area above the TVT function), each echo is rated and attributed a level of confidence. The echo with the highest level of confidence is selected as the echo of interest.

However, especially in the case when multiple echoes are overlapped, it is impossible to accurately estimate the level based on merely a single echo. Instead, the whole picture would be available if the times-of-flight of all of the echoes or at least all potentially relevant echoes are estimated, and that would assist in an accurate level estimation using other known properties on the physical environment.

SUMMARY OF THE INVENTION

It is therefore an object of the present invention to provide an effective method for estimating multiple, even overlapping echoes in an echo amplitude profile.

This and other objects and advantages are achieved by a method for processing an echo amplitude profile, generated by a pulse-echo ranging system with reference to a temporal axis, to identify return echoes comprised by the profile. In accordance with the invention, the method comprises (a) providing a reference echo pulse shape defined by shape parameters and determining a number $k \geq 2$ of echoes to be identified, (b) estimating the strongest echo by its amplitude and position by matching the reference echo pulse shape with respect to its amplitude and position to the echo amplitude profile, (c) subtracting the matched reference echo pulse shape from the echo amplitude profile, (d) $(k-1)$ times repeating preceding steps (b) and (c) for estimating the then strongest echo in the echo amplitude profile, (e) determining an error based on the remaining echo amplitude profile, (f) modifying the reference echo pulse shape by changing at least one of the shape parameters so as to reduce the error, and (g) repeating steps (b) to (f) starting with the modified reference echo shape and the original echo amplitude profile until the error reaches a given minimum or converges to a constant value.

In accordance with the invention, the echo amplitude profile is considered as a result of convoluting a single echo with a channel response sequence. Ideally, i.e., in the absence of noise, the channel response contains non-zero elements only at a position where an echo appears, and its height corresponds to the strength of the echo. The real-life data can be viewed as such generated data, corrupted with noise.

The method of the invention solves the problem of multiple echo detection by breaking the estimation task into the following three major steps of (i) estimating the channel response, (ii) recovering the full shape of a single echo, and (iii) iteratively updating the channel response and echo shape for accuracy.

The estimation of the channel response is treated as a single echo detection problem and includes (i) estimating the strongest echo for its position and amplitude, (ii) removing the echo corresponding to this recovered channel from the echo amplitude profile, and (iii) repeating the preceding steps for the next strongest echo.

This means in detail that, for estimating the channel response, a reference echo pulse shape is projected on the echo amplitude profile and varied in its amplitude and position to match the echo amplitude profile at which the strongest echo is shown. The amplitude and position of the matched reference echo pulse shape is a first estimate of the amplitude and position of the strongest echo. The matched reference echo pulse shape is subtracted from the echo profile, and then the strongest echo, which is the second-strongest echo of the original echo amplitude profile, is estimated in the same manner as in the preceding procedure. The estimation is repeated for a desired number k (in total) of echoes. In the end, there are k echoes estimated by their amplitudes and positions and the echo amplitude profile from which the estimated echoes are removed.

The reference echo pulse shape is defined by shape parameters, some of which may be quite well known in advance. For example, the burst frequency of the echoes is expected to be equal to that of the transmitted ultrasound or radar pulses. Further, in practice, the leading edge of a single echo is generally under good control, and its information can be easily obtained. If the transmitted pulses have a linearly increasing leading edge, the rising section of the echoes will also have an approximately linear envelope. On the other hand, the trailing edge of the echo is difficult to pre-estimate, particularly in acoustic pulse-echo ranging systems with the susceptibility of the transducer to decay or "ringing down" oscillations as a result of stored energy being released by the transducer after excitation. For the first estimation of the echoes in the echo amplitude profile, a reference echo pulse shape based on partial information such as burst frequency and leading edge parameters is sufficient, so that other parameters such as trailing edge parameters, can remain unconsidered at this stage.

Particularly in case of acoustic transmit pulses and a potentially moving target, the burst frequency and leading edge of the single echo may be estimated in sequence by (i) projecting different burst frequencies on the echo amplitude profile and obtaining the burst frequency having the maximum fitting, and (ii) estimating the leading edge and constructing the reference echo pulse shape using the obtained leading edge and burst frequency.

In an alternative embodiment, it is possible to derive and store the reference echo pulse shape from a digitized echo which is received from a reference target. The digitized reference echo may be then analyzed to determine a number of significant shape parameters.

After having removed the estimated echoes from the original echo amplitude profile, the remaining echo profile contains, in the region of the removed estimated echoes noise, disturbances and an estimation error between the non-corrupted echoes and the estimated echoes. The estimation error may be determined as the mean squared error of the remaining echo profile.

In a subsequent step, the reference echo pulse shape is modified by changing at least one of the shape parameters so as to reduce the error. In particular, the definition of reference echo pulse shape may be expanded by parameters that have not yet been considered. In a preferred embodiment of the method of the invention, the trailing edge of the reference echo pulse shape is considered and may be determined as the trailing edge of a Gaussian function whose variance constitutes a trailing edge parameter.

Based on the modified reference echo pulse shape and the original echo amplitude profile, the k echoes are again estimated by their amplitudes and positions. This estimation procedure is repeated, where the reference echo pulse shape are each modified until the error reaches a given minimum or converges to a constant value.

The direction and amount of the modification of the reference echo pulse shape may be based on information on the current shape parameters and the determined estimation error. Alternatively, the reference echo pulse shape may be modified on a trial and error basis, i.e., a modification will be reversed each time the estimation error increases.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now described in more detail with reference to preferred embodiments shown by way of non-limiting example in the attached drawings, in which.

DETAILED DESCRIPTION OF THE PREFERRED EMBODIMENTS

Figure 1:
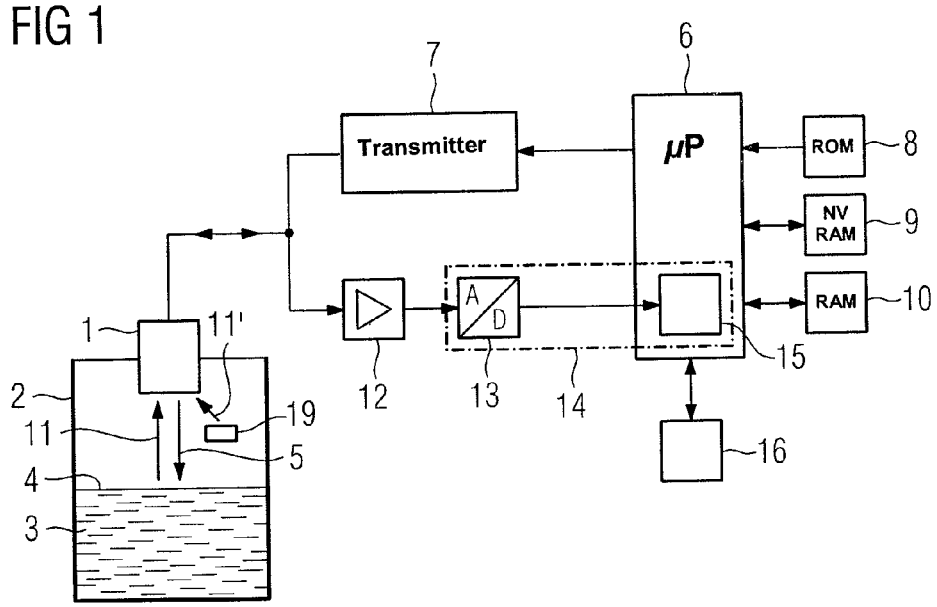
FIG. 1 is a schematic block diagram of a pulse-echo ranging system in which the method of the present invention may be advantageously implemented.

With initial reference to FIG. 1 shown therein is a simplified schematic block diagram of a pulse-echo ranging system that may be ultrasonic or radar based. The system comprises an acoustic or microwave transducer 1 that is installed in a tank 2 containing a liquid 3, or other type of material, with a level determined by the top surface 4 of the liquid 3. The top surface 4 of the liquid 3 provides a reflective surface that reflects ultrasound or radar pulses 5 generated by the transducer 1. The transducer 1 is coupled to a microprocessor 6 through a transmitter 7. The microprocessor 6 operates under a control program stored in read-only memory (ROM) 8, utilizing parameters stored in non-volatile random access memory (NVRAM) 9, and provided with a working memory in the form of random access memory (RAM) 10.

The microprocessor 6 controls the transmitter 7 to excite the transducer 1 to emit the ultrasound or radar pulses 5 at predetermined points in time and with at a predetermined frequency and amplitude. The reflected pulses or echoes 11 from the surface 4 of the material 3, the wall of the tank 2 and obstacles in the measurement environment (not shown) are received by the transducer 1 and converted to an electric signal which may be first amplified in an amplifier 12 before being sampled and digitized by an analog-to-digital (ND) converter 13. The ND converter 13 is an input portion of a digital receiver 14 whose remaining portion is implemented in the microprocessor 6 as software modules 15. The microprocessor 6 executes an algorithm, as will be described below, to determine the echo distance or time-of-flight and thus the level of the liquid 3 in the tank 2. An interface 16, controlled by the microprocessor 6, provides for the export of level-related data and the import of operating parameters. Data may be exported in the form of a display, telemetry (e.g., bus) signals, and/or alarm signals.

The receiver 14 forms a digital echo amplitude profile from the echo raw data, which echo amplitude profile represents, the received echo amplitudes as a function of their respective travel times. Each value of the echo amplitude profile corresponds to the amplitude of an echo 11 reflected at a certain distance from the transducer 1.

Figure 2:
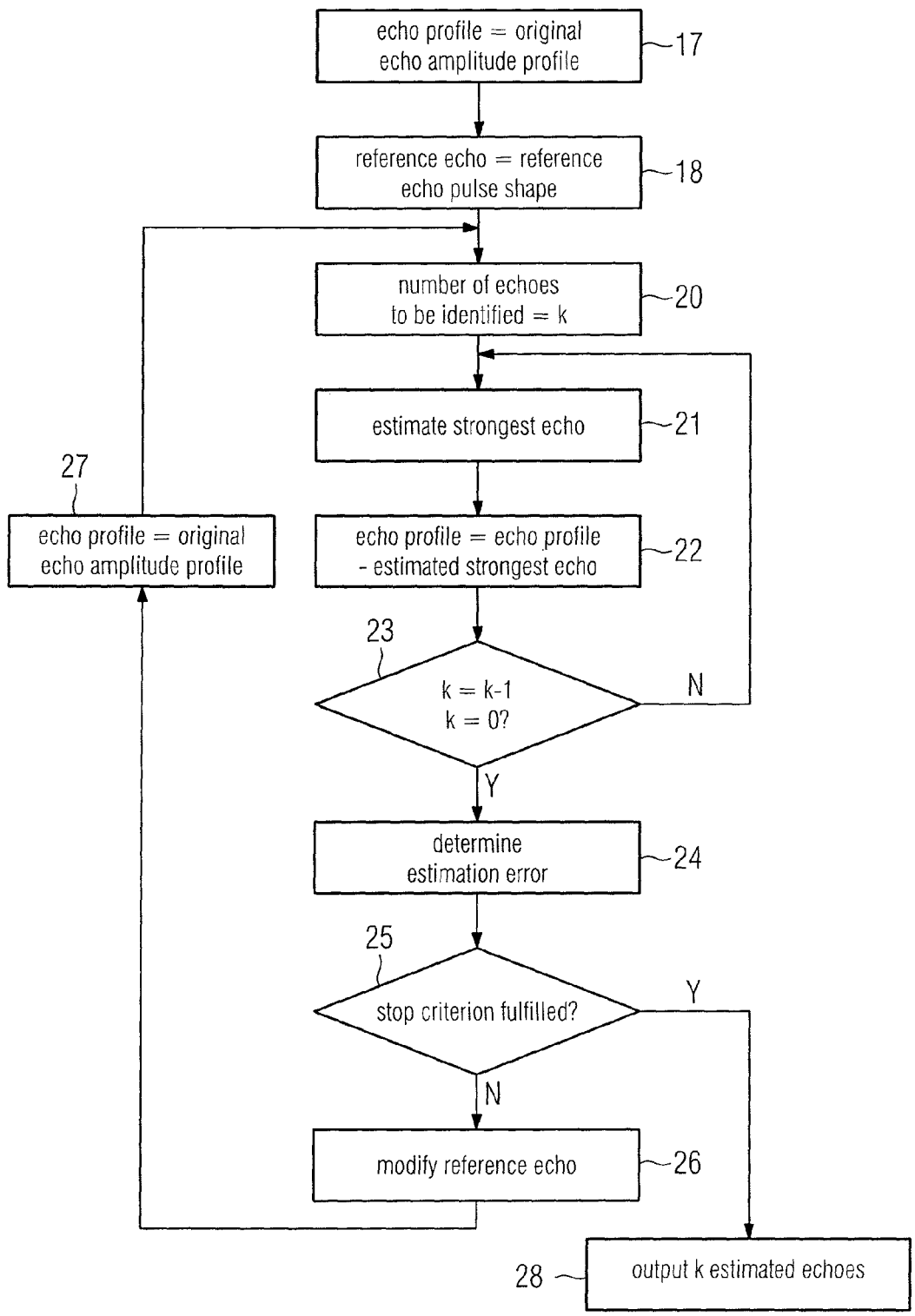
FIG. 2 is a flow chart of the steps of the method in accordance with an embodiment of the invention.

FIG. 2 is a flow chart of the method of in accordance with an embodiment of the invention, which steps are performed by the software module 15 in the microprocessor 6.

With specific reference to FIG. 2, a digital echo profile (echo amplitude profile) is obtained by digitizing the raw data received from the transducer 1, as indicated in step 17.

A digital reference echo (reference echo pulse shape) is provided by shape parameters such as a burst frequency and a linear leading edge of the echo, as indicated in step 18. Alternatively, the reference echo may be derived from an echo 11' (see FIG. 1) that is received from a reference target 19 and analyzed to determine a number of significant shape parameters.

A number k of echoes to be identified in the echo profile is determined, as indicated in step 20.

The strongest echo is estimated by projecting the reference echo, which is based on the shape parameters, to the echo profile to obtain the maximum fitting, as indicated in step 21. The identified echo is defined by the amplitude and position of the matching reference echo.

The identified echo, i.e., the matching reference echo, is subtracted from the echo profile, as indicated in step 22.

Steps 21 and 22 are repeated (k−1) times to estimate the (k−1) next strongest echoes in the echo profile, as indicated in step 23.

After having removed the k strongest estimated echoes from the original echo profile, an estimation error is determined, as indicated in step 24. Here, for example, the estimation error is determined as the mean squared error of the remaining echo profile in the region of the estimated echo.

A checked is performed to determine whether a stop criterion is fulfilled, as indicated in step 25. This stop criterion may be satisfied when the error reaches a given minimum or, in the course of the following steps, converges to a constant value.

If the stop criterion is not fulfilled, then reference echo is modified, as indicated in step 26. Here the modification is performed, for example, by introducing a trailing edge parameter. The trailing edge of the echo shape to be estimated may be that of a Gaussian function whose variance may constitute the trailing edge parameter.

The echo profile is reset to the original echo profile, as indicated in step 27. Subsequently, the preceding steps are repeated, starting with step 20, wherein, in step 23, the shape parameters of the reference echo are changed so as to reduce the error. The entire procedure is repeated until the stop criterion of step 25 is fulfilled.

Once the stop criterion is fulfilled, the k estimated echoes of the echo profile are output, as indicated in step 28. The identified echoes are defined by their shape, amplitudes and positions on the temporal axis. The shape is equal for all estimated echoes.

In the following, three examples are provided to exhibit the performance of the method of the invention. For all of the examples, only the leading section of a single echo is known.

Figure 3:
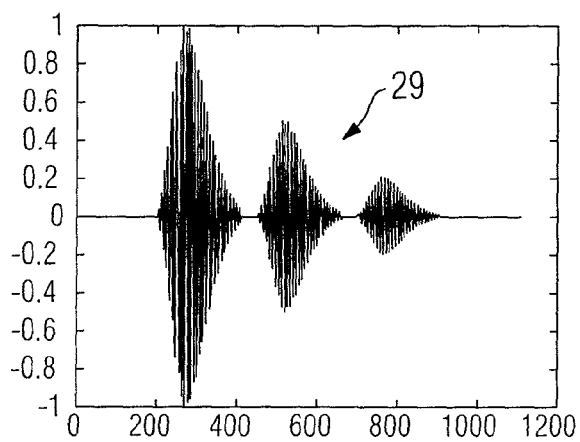
FIGS. 3 to 6 is, in succession and for a first example of graphical plot of well separated ideal echoes, an echo amplitude profile, a reference echo pulse shape, a fully recovered echo pulse shape and a fully recovered channel response sequence.
Figure 4:
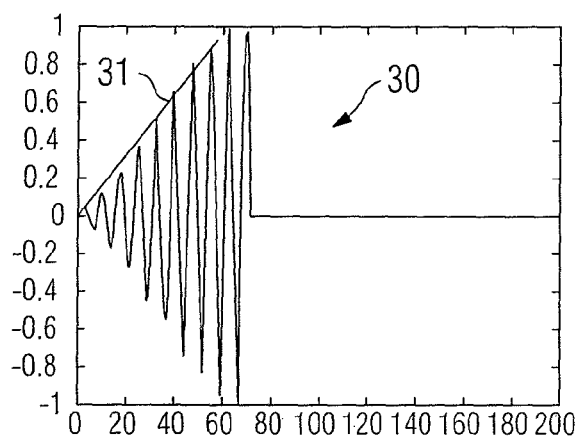
Figure 5:
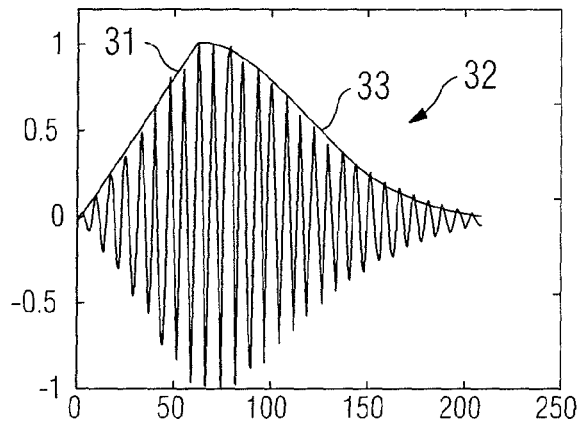
Figure 6:
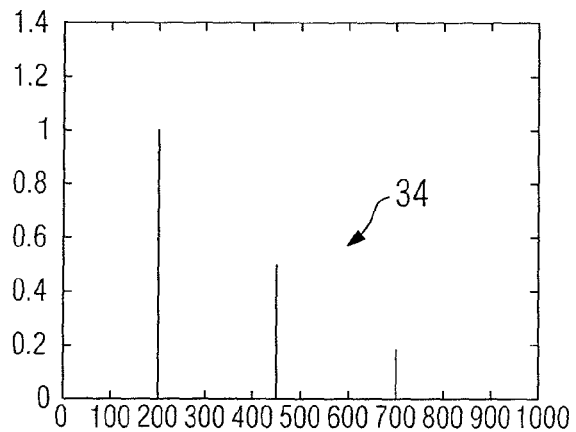
Figure 7:
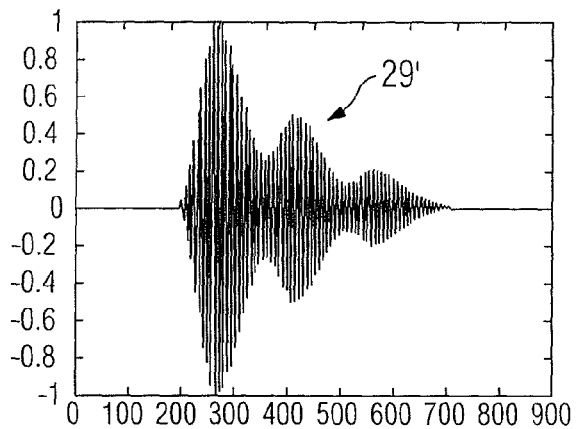
FIGS. 7 to 10 is, in succession and for a second example of a graphical plot of partially overlapping ideal echoes, an echo amplitude profile, a reference echo pulse shape, a fully recovered echo pulse shape and a fully recovered channel response sequence.
Figure 8:
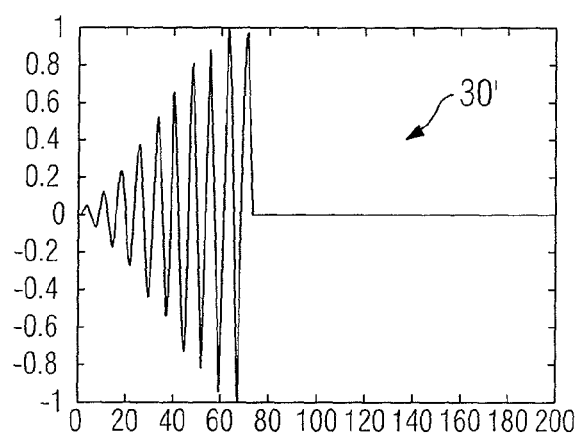
Figure 9:
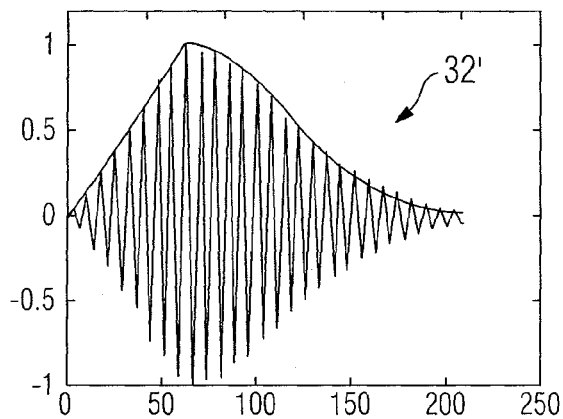
Figure 10:
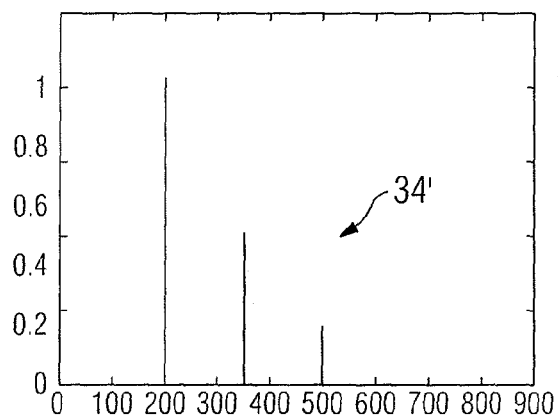

The first example relates to a multiple echo sequence containing three separated echoes with different strength. FIG. 3 shows the echo amplitude profile 29 provided by the received raw data. FIG. 4 shows a reference echo pulse shape 30 having a known burst frequency and a linear leading edge 31. FIG. 5 shows a fully recovered echo pulse shape 32, i.e., the estimated echo shape after the stop criterion has been reached. The echo pulse shape 32 is defined by the burst frequency, the linear leading edge 31 and a trailing edge 33 of a Gaussian function. FIG. 6 shows the fully recovered channel response sequence 34, i.e., the amplitudes and positions of the estimated echoes of the shape 32.

The second example relates to a multiple echo sequence containing three partially overlapping echoes with different strength. FIGS. 7 to 10 show, in succession, the corresponding echo amplitude profile 29', the reference echo pulse shape 30', the fully recovered echo pulse shape 32' and the fully recovered channel response sequence 34'.

Figure 11:
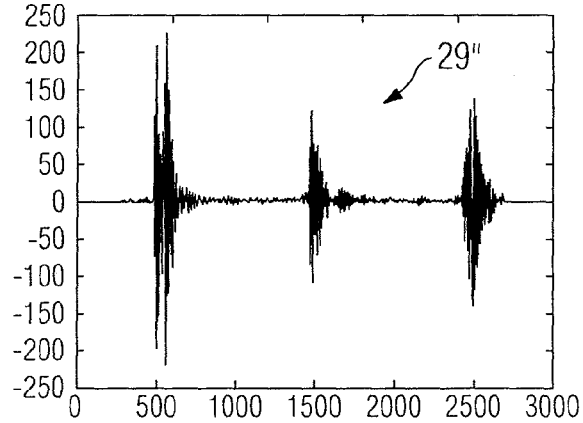
FIGS. 11 and 12 is, in succession and for a third example of a graphical plot of real-life echoes, an echo amplitude profile and a reference echo pulse shape.
Figure 12:
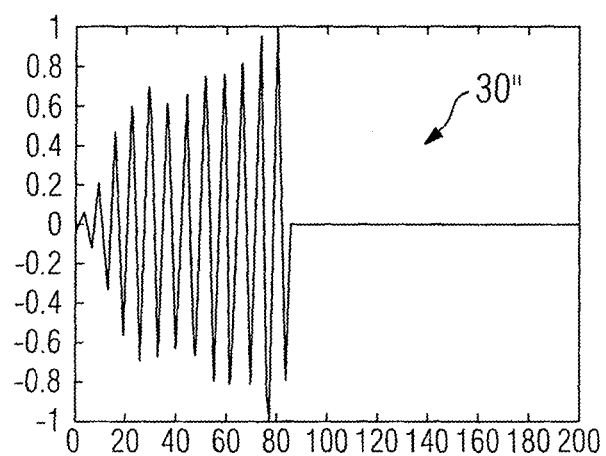

The third example relates to a multiple echo sequence of real-life echoes. FIG. 11 shows the echo amplitude profile 29'' provided by the received raw data. FIG. 12 shows a reference echo pulse shape 30'' that is extracted and saved from another echo profile data collected in the same environment, but which establishes a more stable behavior characteristic. All three echoes in the echo amplitude profile 29'' have a different shape than the reference echo 30'' which itself is not perfectly shaped either. Its rising envelope is not linear. Even though, the method of the invention is still capable of detecting them because the method is insensitive to the distortion on echo shape and noise.

The following is an exemplary computational implementation of the method in accordance with the invention:

```
[frequency] = getFrequency(ref); % ref is the partially known echo
[phase] = getPhase(ref,frequency);
sigma = sigma_initial; % choose an initial value for variance of Gaussian
envelope
While (stop criterion not satisfied)
    [estimatedEcho] = constructEcho(frequency, phase, sigma, ref);
    [channel]=estimateChannel(estimatedEcho, rawDataSequence);
    sigma = updateSigma(channel, estimatedEcho, rawDataSequence,
        sigma);
end
```

The function estimateChannel is described in the following:

```
Function estimateChannel(estimatedEcho, rawDataSequence);
    data = rawDataSequence;
        for iteration = 1:number_channel % desired number of channel
            responses
    Channel = findChannel(estimatedEcho, data); % find single channel
    response
            rawDataEstimated = convolution (channel, estimatedEcho);
            data = data − rawDataEstimated;
        end
    return
```

The functions and their descriptions are listed in the following table:

| Function name | Description |
| --- | --- |
| getFrequency | Estimate burst frequency from partially known echo |
| getPhase | Estimate phase from known information |
| constructEcho | Construct full echo based on burst frequency, phase and envelope |
| updateSigma | Estimate sigma (envelope) based on available information |
| findChannel | Find one channel response and its height |

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for processing an echo amplitude profile generated by a pulse-echo ranging system with reference to a temporal axis so as to identify return echoes comprised by the profile, the method comprising:
   (a) providing a reference echo pulse shape defined by shape parameters and determining a number of echoes to be identified;
   (b) matching the reference echo pulse shape with respect to its amplitude and position to the echo amplitude profile to estimate a strongest echo based on an amplitude and position of an echo having a greatest magnitude;
   (c) subtracting the matched reference echo pulse shape from the echo amplitude profile;
   (d) repeating the preceding steps (b) and (c) for one less than the number of echoes to be identified to estimate a current echo in the echo amplitude profile having the greatest magnitude;
   (e) determining an error based on a remaining echo amplitude profile;
   (f) changing at least one shape parameter of the shape parameters to reduce the error so as to modify the reference echo pulse shape; and
   (g) repeating steps (b) to (f) starting with the modified reference echo shape and an original echo amplitude profile until the error reaches a given minimum or converges to a constant value.

2. The method according to claim 1, wherein the shape parameters comprises at least burst frequency and envelope parameters of the reference echo pulse shape.

3. The method according to claim 2, wherein the envelope parameters of the reference echo pulse shape comprise leading and trailing edge parameters.

4. The method according to claim 3, wherein the trailing edge parameter remains unconsidered in step (a) and is used a first time in step (f).

5. The method according to claim 3, wherein the trailing edge parameter of the reference echo pulse shape is determined as a trailing edge of a Gaussian function whose variance constitutes the trailing edge parameter.

6. The method according to claim 4, wherein the trailing edge parameter of the reference echo pulse shape is determined as a trailing edge of a Gaussian function whose variance constitutes the trailing edge parameter.

7. The method according to claim 1, wherein the number of echoes to be identified is greater than or equal to two.

* * * * *